United States Patent [19]

Matsuo

[11] Patent Number: 4,595,278

[45] Date of Patent: Jun. 17, 1986

[54] IMAGE FORMING APPARATUS

[75] Inventor: Naohiko Matsuo, Yokohama, Japan

[73] Assignee: Kabushiki Kaisha Toshiba, Kawasaki, Japan

[21] Appl. No.: 684,721

[22] Filed: Dec. 21, 1984

[30] Foreign Application Priority Data

Dec. 26, 1983 [JP] Japan .................................. 58-246132

[51] Int. Cl.$^4$ ...................... G03G 15/00; G03G 15/28; G03B 27/54
[52] U.S. Cl. ................................ 355/14 R; 355/14 E; 355/8; 355/67
[58] Field of Search .............. 355/8, 14 E, 69, 14 SH, 355/67, 14 C, 14 R

[56] References Cited

U.S. PATENT DOCUMENTS

| | | | |
|---|---|---|---|
| 4,183,656 | 1/1980 | Ishihara et al. | 355/14 E X |
| 4,217,052 | 8/1980 | Tani et al. | 355/8 |
| 4,413,900 | 11/1983 | Abe et al. | 355/8 |

Primary Examiner—Arthur T. Grimley
Assistant Examiner—C. Romano
Attorney, Agent, or Firm—Cushman, Darby & Cushman

[57] ABSTRACT

A copying machine has a document table on which a document is to be placed, an exposure lamp for exposing the document placed on the document table, a scanning circuit for reciprocating the exposure lamp with respect to the document so as to optically scan the document and an image forming unit for forming an image of the document in response to light reflected by the document scanned by the exposure lamp. Switches are provided for detecting that the exposure lamp is located at a scanning start position, a scanning end position and a position removed by a predetermined distance from the scanning start position. The exposure lamp is turned off at the scanning end position and is turned on when the exposure lamp is located at the position removed by the predetermined distance from the scanning start position before the exposure lamp returns to the scanning start position in the continuous copying mode. When the exposure lamp returns to the scanning start position, the amount of light emitted from the exposure lamp has reached a predetermined amount, and the copying machine is ready for the next copy operation.

6 Claims, 35 Drawing Figures

FIG. 2A
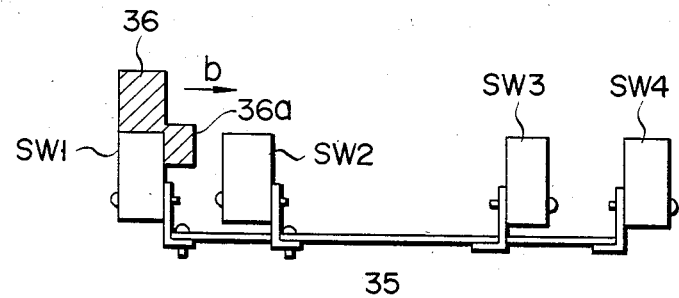
FIG. 2B
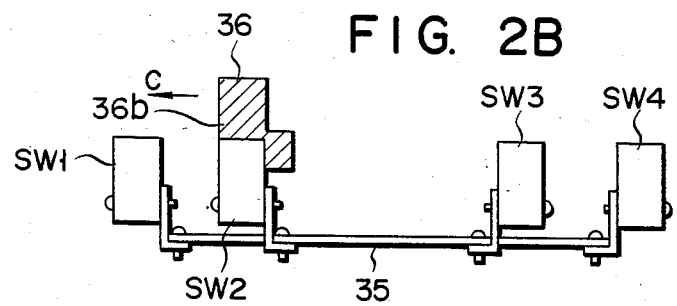
FIG. 3A (SW1)
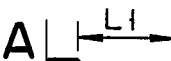
FIG. 3B (SW2)
FIG. 3C (SW3)
FIG. 3D (SW4)

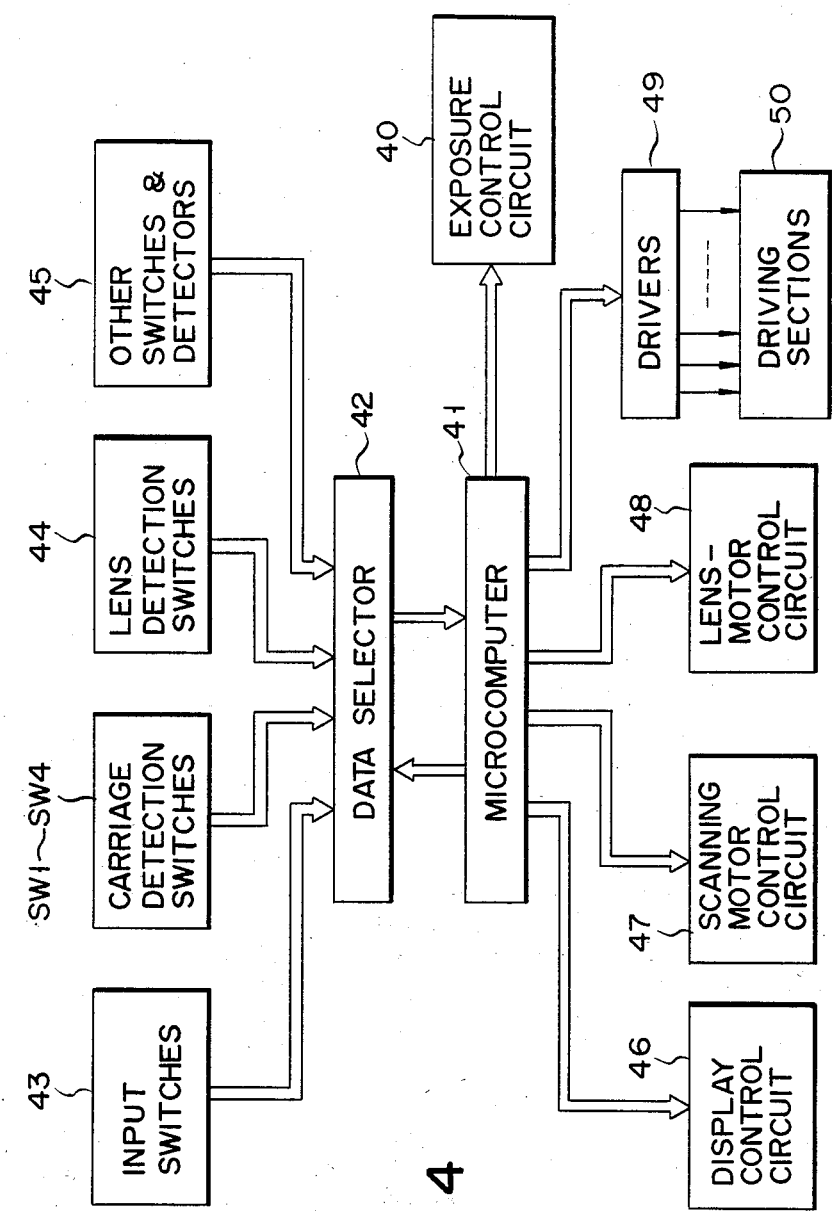
F I G. 4

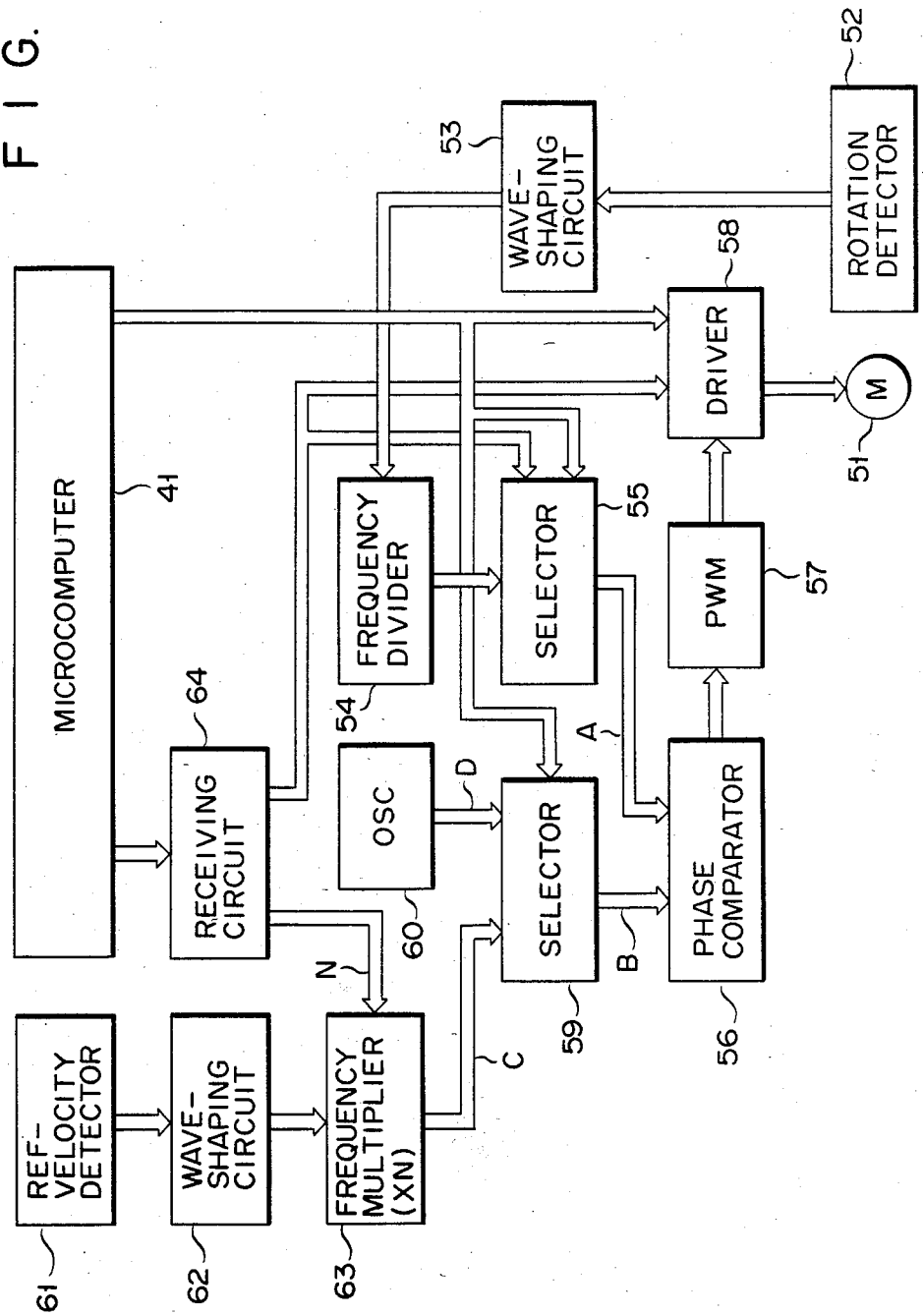

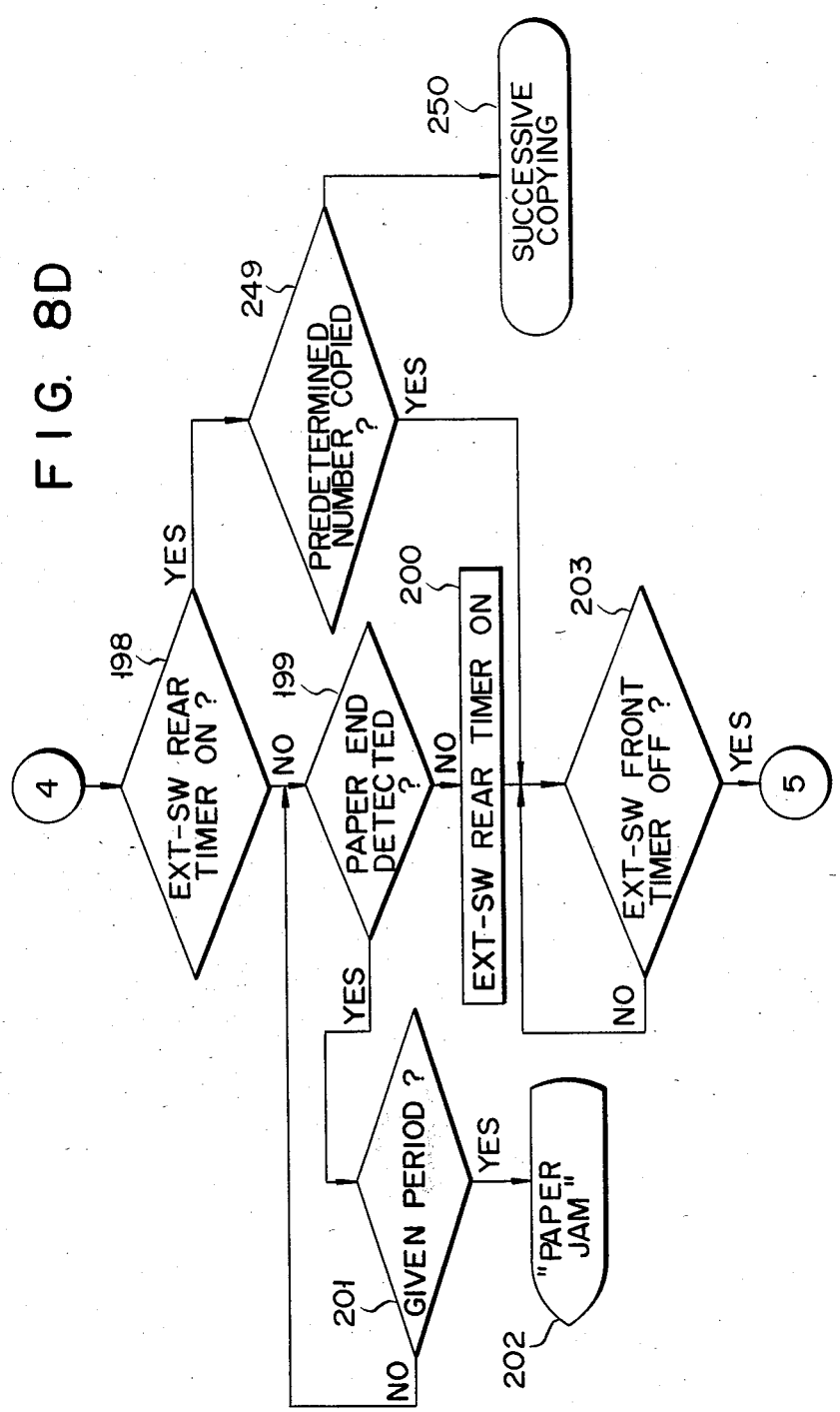

FIG. 10A (LOW SPEED BACKWARD SIG.)
FIG. 10B (HIGH SPEED BACKWARD SIG.)
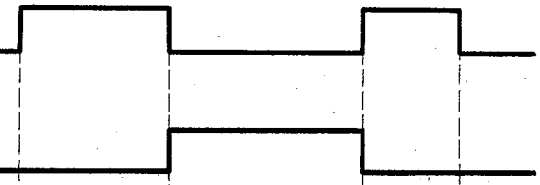
FIG. 10C (SW2)
FIG. 10D (SW1)
FIG. 10E (VELOCITY)
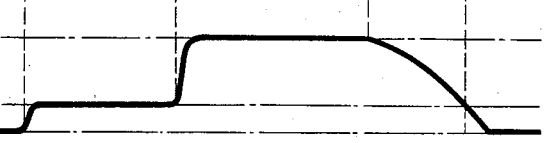
FIG. 11A (LOW SPEED BACKWARD SIG.)
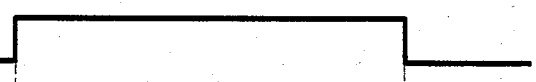
FIG. 11B (HIGH SPEED BACKWARD SIG.)
FIG. 11C (SW2)
FIG. 11D (SW1)
FIG. 11E (VELOCITY)
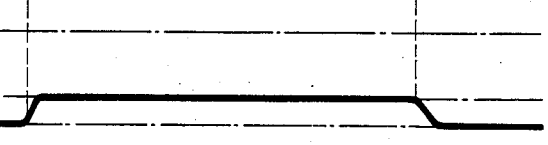

(START KEY)

(P-STR-SOL)

(P-FEED-SOL)

(LAMP 5)

(SW1)

(SW2)

(EXT-SW)

IMAGE FORMING APPARATUS

BACKGROUND OF THE INVENTION

The present invention relates to an image forming apparatus such as a copying machine having a continuous copying function for continuously forming a plurality of copies.

A conventional copying machine has a continuous copying function for continuously forming a plurality of copies when a copy start button is depressed once. A copying number setting means is provided in such a copying machine to set a copying number. When a copying number is at least two, the number of times the document is optically scanned with an exposure lamp corresponds to that copying number, and the thus same copying operation is repeated a number of times. The exposure lamp comprises an elongated lamp extending perpendicularly to the scanning direction. After the lamp is moved from one end (a scanning start position) to the other end (a scanning end position) of the document, the scanning operation is completed, and the exposure lamp returns to the scanning start position for the next copying operation. In a continuous copying mode, the exposure lamp is reciprocated a number of times along the document. During this operation, since a great amount of heat is radiated from the exposure lamp, the exposure lamp is turned off during the return movement from the scanning end position to the scanning start position. When the exposure lamp returns to the scanning start position, it is turned on again. A sheet is fed from the paper feed cassette at the same time the exposure lamp is turned on.

The exposure lamp cannot stably emit a predetermined amount of light immediately after it is turned on. It takes a preliminary lighting time of several hundreds of microseconds until the amount of light is stabilized. For this reason, in a conventional copying machine, a continuous copying time cannot be a simple multiple of the single copying time but takes longer because of the preliminary lighting time required for each copying. In the above embodiment, a copying machine is of a fixed document type where the exposure lamp is moved. However, in another conventional copying machine wherein the exposure lamp is fixed and the document is moved, the same phenomenon as described above occurs.

SUMMARY OF THE INVENTION

It is an object of the present invention to provide an image forming apparatus for effectively performing continuous image formation.

In order to achieve the above object of the present invention, there is provided an image forming apparatus comprising a document table on which a document is placed, exposure means for exposing the document placed on the document table, scanning means for optically scanning the document by moving the exposure means and the document table relative to each other, image forming means for forming a document image on an image forming medium in accordance with light reflected by the document scanned with the scanning means, detecting means for detecting that the exposure means or the document table is located at a scanning start position, a scanning end position and a position removed by a predetermined distance from the scanning start position, and exposure controlling means for turning on the exposure means when the exposure means or the document is located at the position removed by the predetermined distance from the scanning start position and for turning off the exposure means when the exposure means or the document is located at the scanning end position in response to an output from the detecting means in a continuous image forming mode.

BRIEF DESCRIPTION OF THE DRAWINGS

FIGS. 2A and 2B are views showing the position detection switches of a carriage for reciprocating an exposure lamp;

FIGS. 3A to 3D are timing charts for explaining the operation of carriage position detection switches shown in FIGS. 2A and 2B;

FIG. 4 is a block diagram of a control circuit for controlling the overall copying machine;

FIG. 5 is a detailed block diagram of a scanning motor control circuit in FIG. 4;

FIGS. 8A to 8E are flow charts for explaining the copying operation;

FIGS. 10A to 10E and FIGS. 11A to 11E are timing charts for explaining the return movement of the carriage.

DETAILED DESCRIPTION OF THE PREFERRED EMBODIMENT

An embodiment of the present invention will be hereinafter described with reference to the accompanying drawings.

Figure 1:
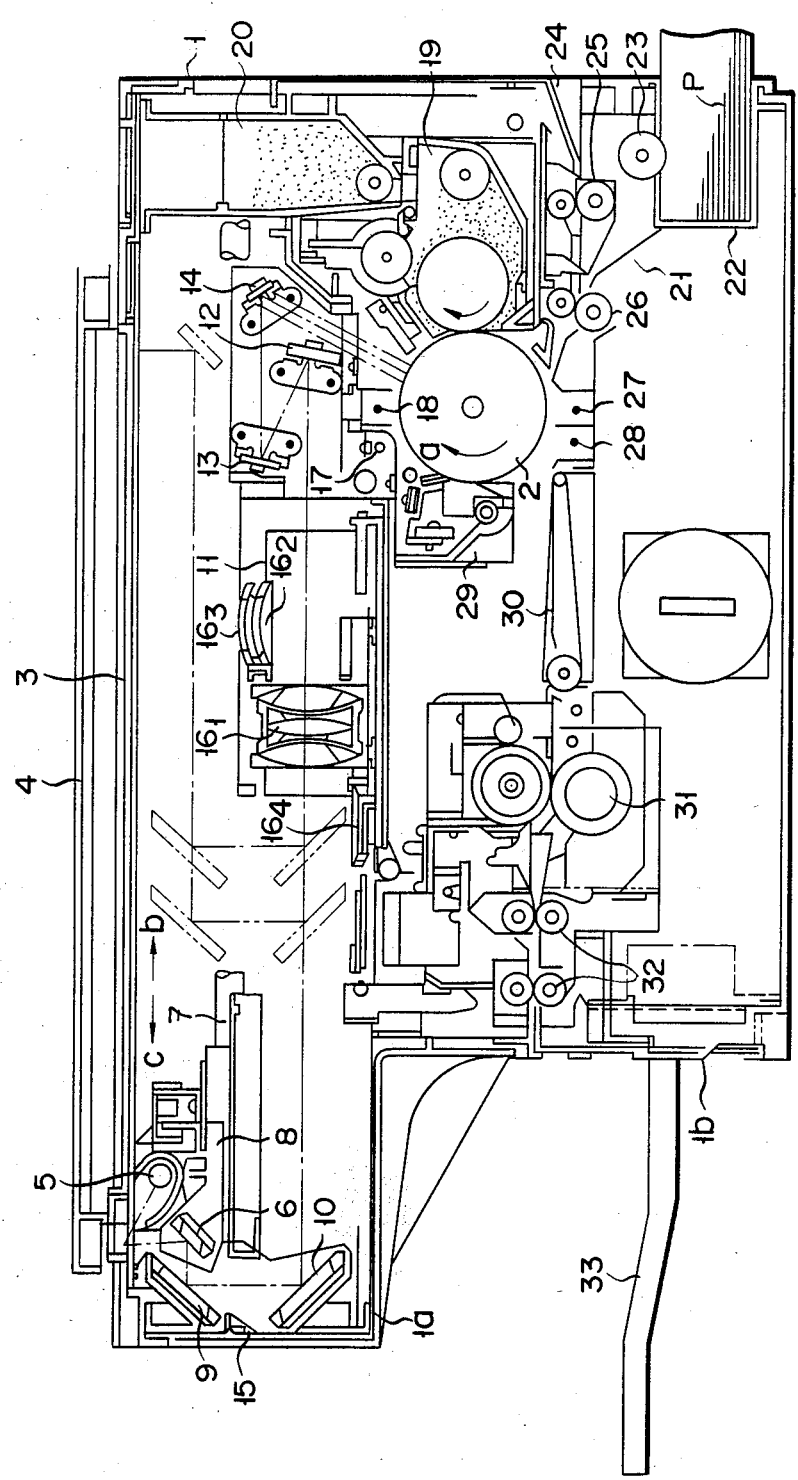
FIG. 1 is a longitudinal front view schematically showing a copying machine as an image forming apparatus according to an embodiment of the present invention.

FIG. 1 shows a copying machine of document table fixed type as an embodiment of an image forming apparatus according to the present invention. A photosensitive drum 2 which is rotated along a direction indicated by an arrow a in FIG. 1 is arranged at a substantially central portion of a housing 1 of the copying machine. A document table (transparent glass plate) 3 for placing a document thereon is fixed on an upper portion of the housing 1. A document cover 4 is provided on the document table 3 so as to be freely opened and closed. An exposure lamp 5 and a mirror 6 as an exposure means are provided under the document table 3. The exposure lamp 5 and the mirror 6 are mounted on a first carriage 8 which moves reciprocally along a guide shaft 7 in directions indicated by arrows b and c in FIG. 1. Upon movement of the first carriage 8, the exposure lamp 5 and the mirror 6 can optically scan from one end to the other or one side to the other of the document. Then, light emitted from the exposure lamp 5 and reflected by the document is supplied to a surface of the photosensitive drum 2 through the mirror 6, mirrors 9 and 10, a lens unit 11, and stationary mirrors 12, 13 and 14, thereby slit-exposing an image on the document. The mirrors 9 and 10 are mounted on a second carriage 15. The second carriage 15 moves with the first carriage 8 at a speed half that of the first carriage 8. The lens unit 11 includes a main lens $16_1$ which is movable along directions indicated by the arrows b and c, and magnification auxiliary lenses $16_2$, $16_3$ and $16_4$ which are selectively arranged before and after the main lens $16_1$ and which change the synthetic focal length of the overall lens system. Furthermore, the first and second carriages 8 and 15 are driven by a single wire (not shown) which is looped around the corresponding pulleys. The exposure lamp 5, the mirrors 6, 9 and 10, the lens unit 11 and the mirrors 12 to 14 constitute an optical system.

A discharger lamp 17 for discharging a residual charge on the surface of the photosensitive drum 2 and a charger 18 for charging the surface thereof are arranged around the photosensitive drum 2 along a rotating direction thereof. The surface of the photosensitive drum 2 which is alternately discharged and charged is exposed by the above-mentioned optical system so as to form an electrostatic latent image thereon. A developing unit 19 for visualizing the latent image on the photosensitive drum 2 with toner is provided adjacent to the charger 18. A toner hopper 20 for supplying toner to the developing unit 19 is provided above an upper portion thereof. A paper feed unit 21 for feeding paper sheets below the photosensitive drum 2 is arranged adjacent to the developing unit 19. The paper feed unit 21 comprises a manual feed port 24 and a paper feed cassette 22. The sheet cassette 22 is detachably loaded in the housing 1. The paper feed cassette is made so as to correspond to sizes of copying paper sheets, and stores paper sheets P. A paper feed roller 23 for picking up the paper sheets P one by one is provided above the paper feed cassette 22. A manual paper feed unit (not shown) is mounted on the manual paper feed port 24. The paper sheet P fed from the manual paper feed unit is fed to the aligning rollers 26 through paper feed roller 25. One of the paper feed roller 23 and the paper feed roller 25 is selectively driven in response to a selection signal supplied from an operation panel so as to feed the paper sheet P to aligning rollers 26. The aligning rollers 26 align a leading end of the paper sheet P and feed the sheet P to an image transfer unit in synchronism with other units of the copying machine.

A transfer charger 27 for transferring a toner image formed on the surface of the photosensitive drum 2 onto the paper sheet P fed by the aligning rollers 26, and a peeling charger 28 for peeling the paper sheet P having the toner image thereon from the surface of the photosensitive drum 2 are provided in the image transfer unit arranged adjacent to the paper feed unit 21. A cleaning unit 29 for recovering residual toner particles remaining on the surface of the photosensitive drum 2 is arranged adjacent to the peeling charger 28.

A convey unit 30 for conveying the paper sheet separated from the photosensitive drum 2 is provided adjacent to the separation charger 28. Heat rollers 31 as a fixing unit for fixing the transferred image on the paper sheet is provided at a terminal end of the convey unit 30. The paper sheet on which the image is fixed thereon is exhausted by exhaust rollers 32 onto an exhaust tray 33 provided outside the housing 1.

The housing 1 is divided into upper and lower casings 1a and 1b having a convey path 30 at a boundary. Both the casings 1a and 1b are pivotally supported by a pivot shaft (not shown) at one end thereof such that the casing 1a can be opened at a predetermined angle. In the upper casing 1a, the photosensitive drum 2, the document table 3, the optical system, the charger 18, the developing unit 19, the paper feed rollers 25, the upper aligning roller 26, the cleaning unit 29, the heat roller 31, the upper exhaust rollers 32 and the like are arranged. In the lower casing 1b, the paper feed cassettes 22A and 22B, the paper feed rollers 23 and 25, the lower aligning roller 26, the chargers 27 and 28, the convey unit 30, the lower heat roller 31, the lower exhaust roller 32, the exhaust tray 33 and the like are arranged.

Although not shown in FIG. 1, position detection switches SW1 to SW4 which are turned on and off in accordance with the position of the second carriage 15 are provided in the path of the second carriage 15. These switches SW1 to SW4 are mounted on a support member 35 at predetermined intervals, as shown in FIGS. 2A and 2B. These switches SW1 to SW4 are a proximity sensor, such as a lead switch, a photocoupler, a microswitch or any other detector for detecting the approach of an L-shape member 36 of the second carriage 15. The operation timing of these switches SW1 to SW4 is shown in FIGS. 3A to 3D. The switch SW1 is a detector for detecting an initial scanning position of the carriage 15 (indicated by a solid line in FIG. 1) as shown in FIG. 3A. The switch SW2 is a detector for detecting that the carriage 15 has reached a position at a predetermined distance from the switch SW1, as shown in FIG. 3B. The switch SW3 is a detector for detecting that the carriage 15 has reached the limit position in the enlargement copying mode, as shown in FIG. 3C. The switch SW4 is a detector for detecting that the carriage 15 has reached the limit position in the equal copying mode, as shown in FIG. 3D.

FIG. 4 schematically shows the overall control circuit. Reference numeral 41 denotes a microcomputer as a main controller for controlling the overall copying machine. Input switches 43 such as various keys on the operation panel, the carriage detection switches SW1 to SW4, lens detection switches 44 for detecting the position of the main lens $16_1$, other switches and detectors 45 and the like are respectively connected to an input of the microcomputer 41 through a data selector 42. A display control circuit 46 for controlling the liquid crystal display unit and the various displays on the operation panel, a scanning motor control circuit 47 for controlling a scanning motor for driving the carriages, an exposure lamp control circuit 40 for controlling the exposure lamp 5, and a lens motor control circuit 48 for moving the main lens $16_1$ are respectively connected to an output of the microcomputer 41. Furthermore, driving sections 50 for the various charger, solenoids and clutches are also connected to the output of the microcomputer 41 through a driver 49.

FIG. 5 shows the scanning motor control circuit 47 in more detail. For example, a scanning motor 51 is a DC brushless motor. A rotation detector 52 is provided for detecting the rotational frequency of the motor 51. The rotation detector 52 generates a signal having a frequency proportional to the rotational frequency of the motor 51. The signal from the detector 52 is wave-shaped by a wave-shaping circuit 53 and thereafter is supplied to a frequency divider 54. The frequency divider 54 generates signals having frequencies 1/1, ½ and ¼ that of the input signal, respectively. These three signals are supplied to a selector 55. The selector 55 generates the ½ or 1/1 frequency signal in accordance with a moving speed determined by the current copying magnification when the carriages move forward. The selector 55 generates the ¼ frequency signal when the carriages move backward at a high speed, or generates the 1/1 frequency signal when it is driven in the backward direction at a low speed. An output signal A from the selector 55 is supplied to a phase comparator 56. The comparator 56 detects a phase difference between the signal A and a reference signal B having a reference frequency, and generates an analog voltage corresponding to this phase difference and a polarity thereof. The analog voltage is supplied to a pulse width modulator (PWM) 57. The PWM 57 generates a pulse signal having a pulse width corresponding to the analog voltage. The signal from the PWM 57 is supplied to a driver 58. The driver 58 applies a driving voltage to the motor 51 during an interval corresponding to the pulse width of the output signal of the PWM 57. In other words, an effective value of the driving voltage applied to the motor 51 changes in accordance with the pulse width of the output signal from the PWM 57. In such a feedback loop, the rotational frequency of the motor 51 is controlled to be proportional to the reference signal B.

The reference signal B is the output of the selector 59. When the carriages move forward, a signal C is selected by the selector 59. When the carriages move backward, a signal D having a fixed frequency from an oscillator (OSC) 60 is selected. The signal C is obtained in such a manner that an output signal from a reference velocity detector 61 which generates a signal having a frequency proportional to the rotational frequency of the photosensitive drum 2 is wave-shaped in a wave-shaping circuit 62, and the frequency of the output signal from the circuit 62 is multiplied by N by a PLL frequency multiplier 63. Note that "N" is determined in such a manner that a signal having a plurality of bits which is serially transmitted from the microcomputer 41 is received by a receiving circuit 64 and is converted into parallel data. More specifically, when the copying magnification is assumed to be X%, N can be expressed by $$N = K/X$$

where K is constant, and a decimal part of K/X is rounded. The frequency multiplier 63 sets the scanning speed (moving speed of the carriages) in accordance with the copying magnification.

To summarize, when the carriages move forward, the motor 51 is rotated at a rotational frequency proportional to the frequency N times that proportional to the rotational frequency of the photosensitive drum 2. When the carriages move backward at a high speed, the motor 51 is rotated in the reverse direction at the frequency proportional to that of the oscillator 60. When the carriages move backward at a low speed, the motor 51 is rotated at a rotational frequency ¼ the frequency of the high-speed backward movement in the same direction as that thereof.

Figure 6A:
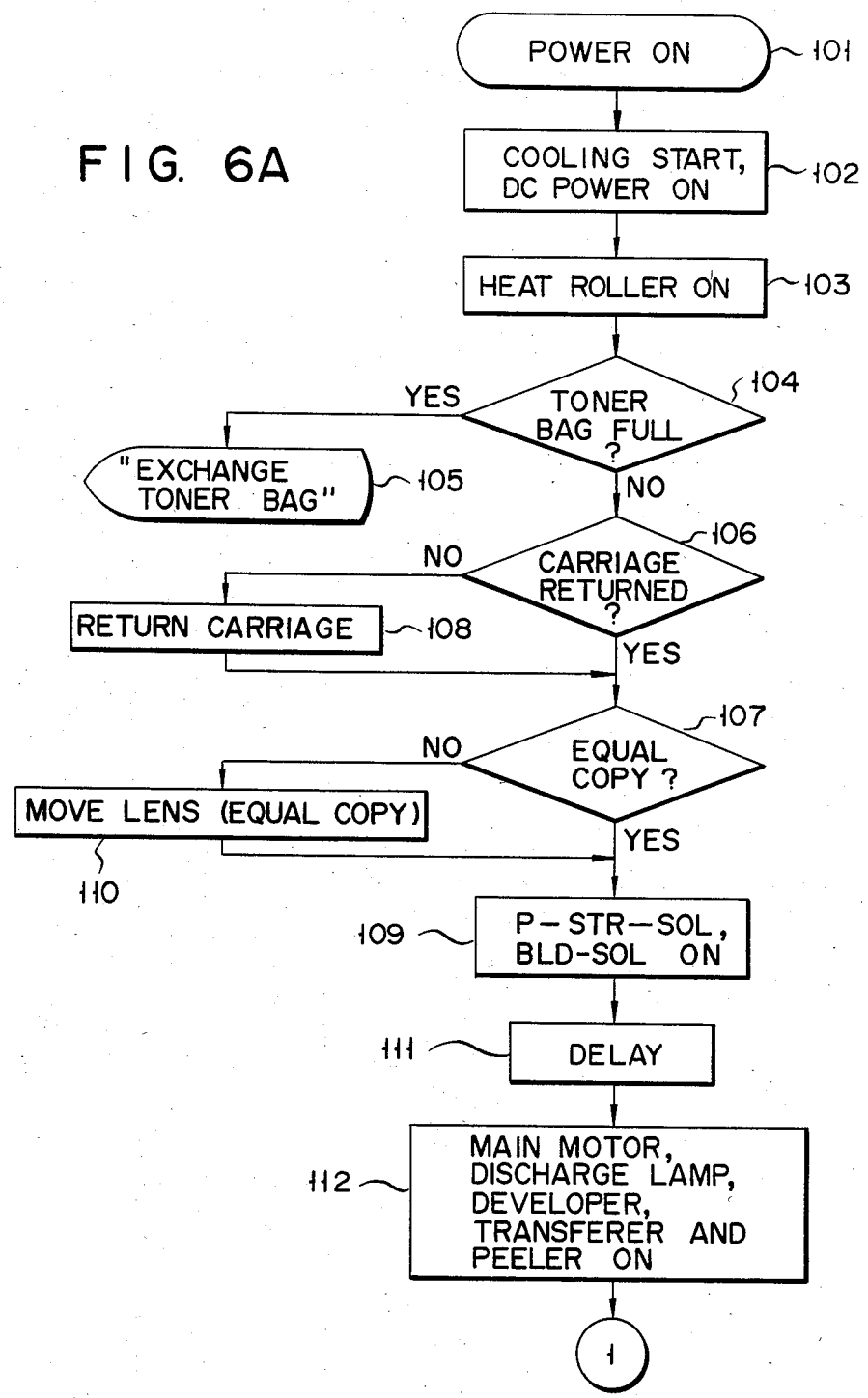
FIGS. 6A and 6B are respectively flow charts for explaining the operation after the power switch is turned on and the copying ready state is obtained.
Figure 6B:
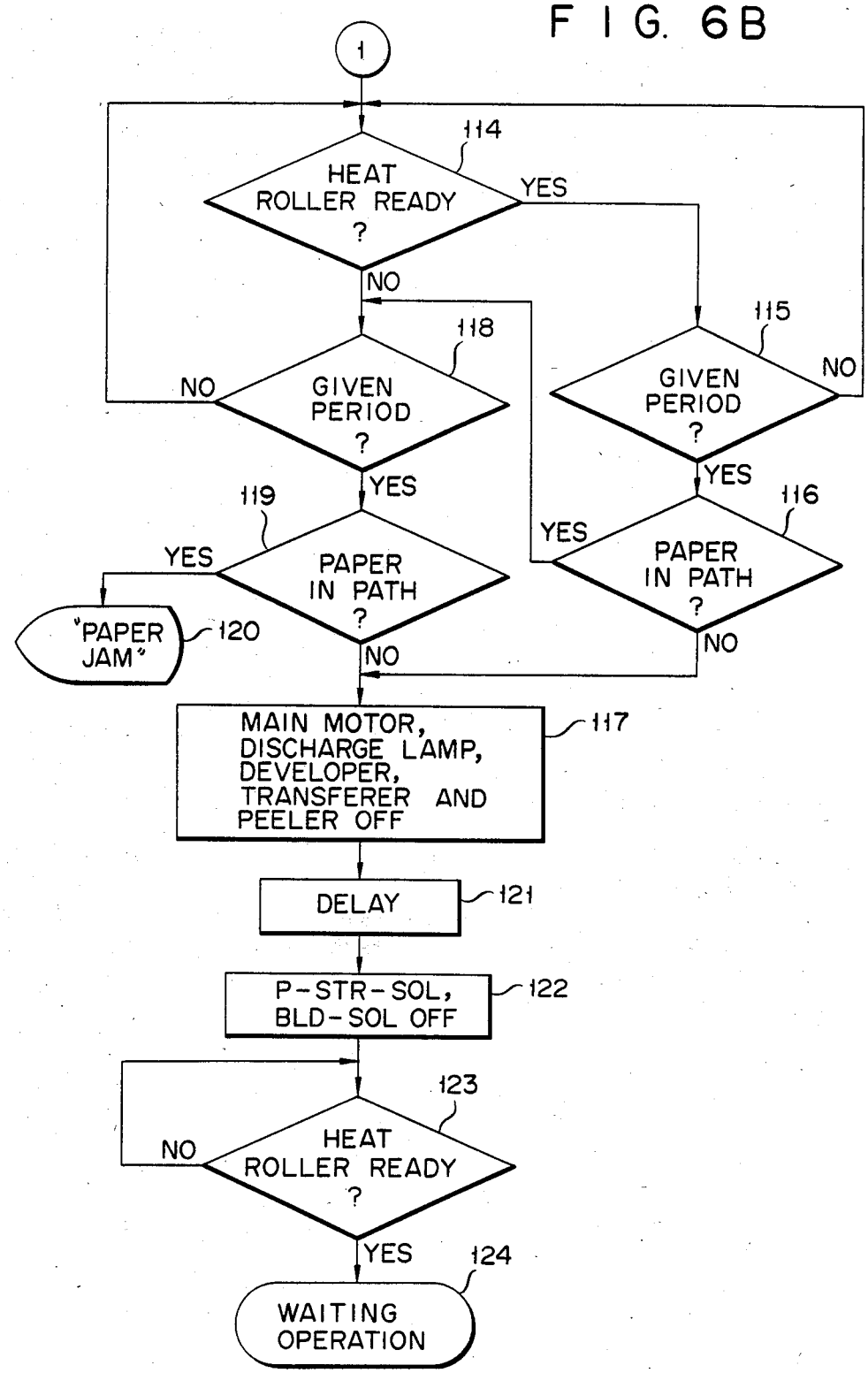

The operation of the embodiment having the above arrangement will be described hereinafter. First, the operation from power ON to the waiting operation mode will be described with reference to flow charts shown in FIGS. 6A and 6B. When the power is turned on in step 101, an exhaust fan (not shown) is turned on so as to cool the inside of the machine and DC power is supplied to the control circuit in step 102. A heater of the heat rollers 31 is turned on, thereby heating them in step 103. Then, the microcomputer 41 determines whether or not a toner bag in the cleaning unit 29 is full by a toner level detector (not shown) in step 104. If YES in step 104, "EXCHANGE TONER BAG" is displayed in step 105. If NO in step 104, the following operation is performed. The microcomputer 41 determines from the operating state of the switch SW1 whether or not the carriages are returned and positioned at the scanning initial position in step 106. If YES in step 106, the flow advances to step 107. If NO in step 106, the carriages are returned to the initial position in step 108, and the flow then advances to step 107. In step 107, the microcomputer determines from the operating state of the position detection switches 42 whether or not the main lens 16₁ of the lens unit 11 is positioned at the equal copy mode position (or initial position). If YES in step 107, the flow advances to step 109. If NO in step 107, the main lens 16₁ is returned to the equal mode position in step 110, and thereafter step 109 is executed. In step 109, a paper start solenoid (P-STR-SOL) for controlling the aligning rollers 26 and a blade solenoid (BLD-SOL) for controlling a cleaning blade of the cleaning unit 29 are turned on. Thus, the aligning rollers 26 are rotated and the cleaning blade is urged against the surface of the photosensitive drum 2. After the cleaning blade is operated for a predetermined length of time in step 111, a main motor, the discharger lamp 17, a developing bias, the transfer charger 27 and the peeling charger 28 are respectively turned on in step 112. This state is called a "forced paper exhausting state" and is continued for a predetermined interval (e.g., about seven seconds). If a paper sheet remains on the convey path in the copying machine, it is exhausted onto the exhaust tray 33 during this predetermined interval. In step 114, the microcomputer determines whether or not the heat rollers 31 are heated to a fixing enable temperature. If YES in step 114, the microcomputer determines in step 115 whether or not the predetermined interval has passed from when the main motor was turned on. If YES in step 115, the microcomputer determines whether or not the paper sheet remains on the convey path in step 116. If NO in step 116, the flow advances to step 117. If YES in step 116, the microcomputer determines in step 118 whether or not the predetermined interval has passed from when the main motor was turned on. If YES in step 118, the microcomputer in step 119 determines again whether or not the paper sheet remains on the convey path. If YES in step 119, "PAPER JAM" is displayed in step 120. If NO in step 119, step 117 is executed. In step 117, the main motor, the discharger lamp 17, the developing bias, the transfer charger 27 and the peeling charger 28 are respectively turned off. After a sufficient time during which the main motor has been stopped (step 121), the BLD-SOL and the P-STR-SOL are turned off in step 122. Thereafter, the microcomputer determines whether or not the heat rollers 31 are ready in step 123. If YES in step 123, the copying machine is placed in the waiting mode in step 124.

Figure 7:
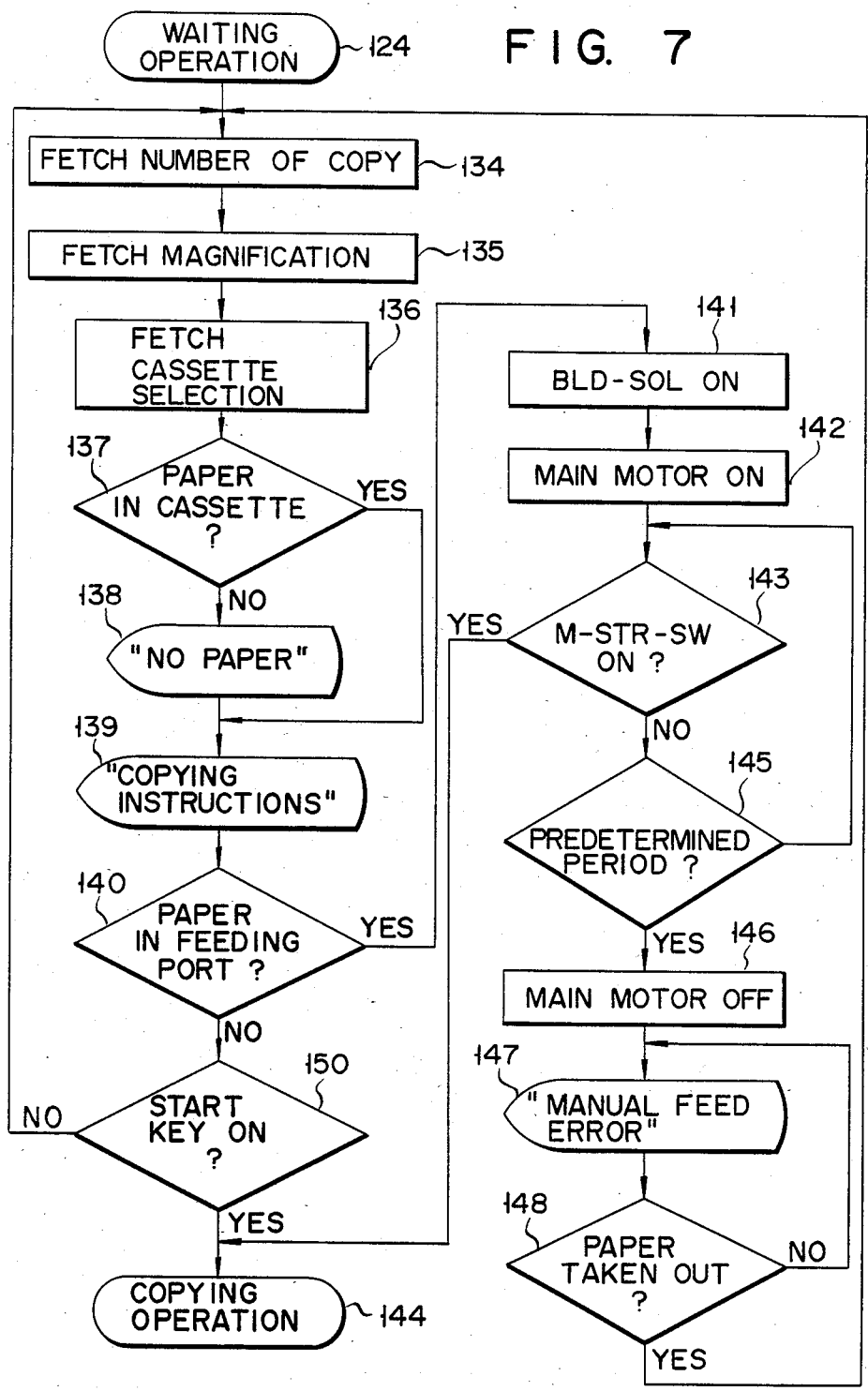
FIG. 7 is a flow chart for explaining the operation during the waiting state after the ready state is obtained and before copying is started.
Figure 8A:
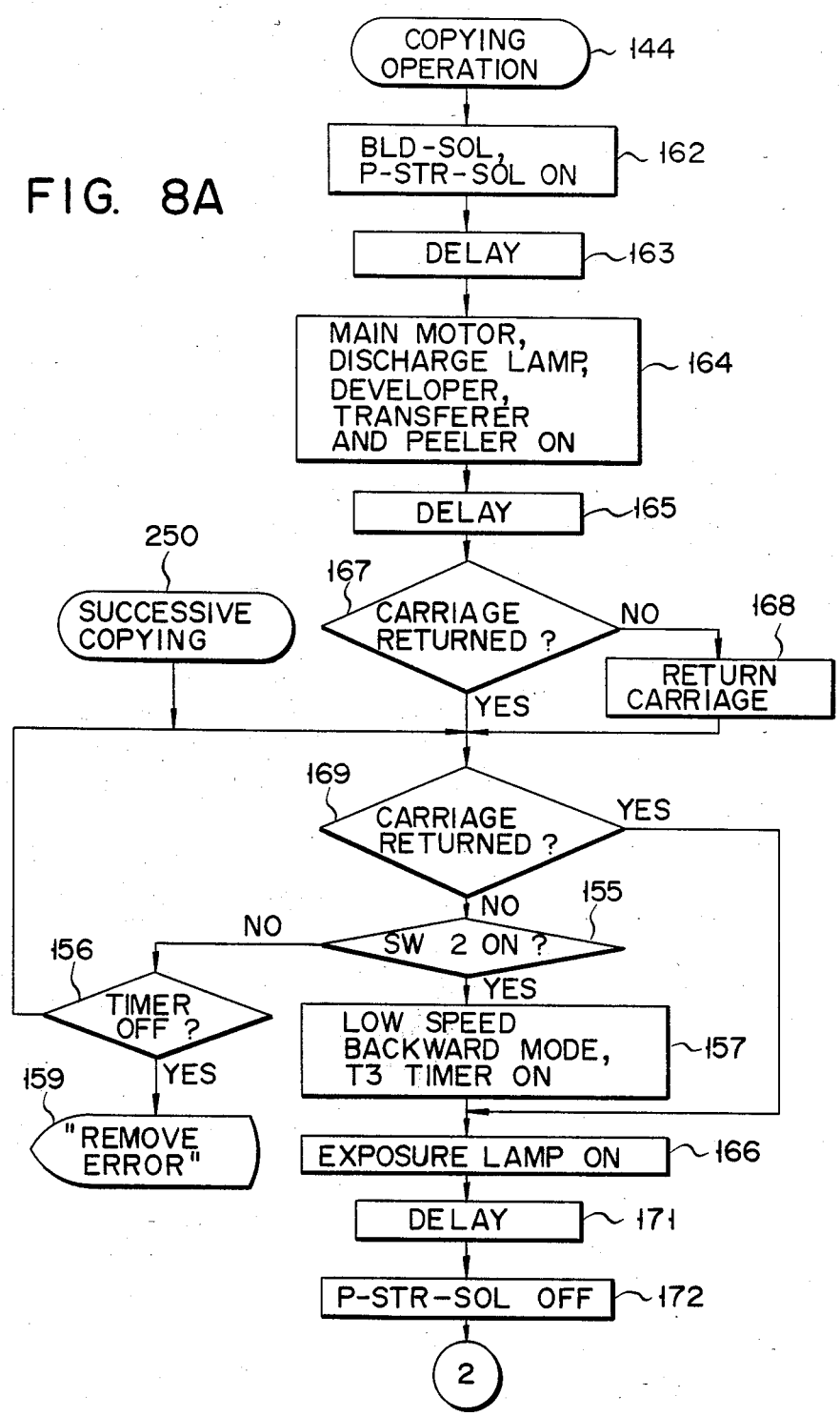
Figure 8B:
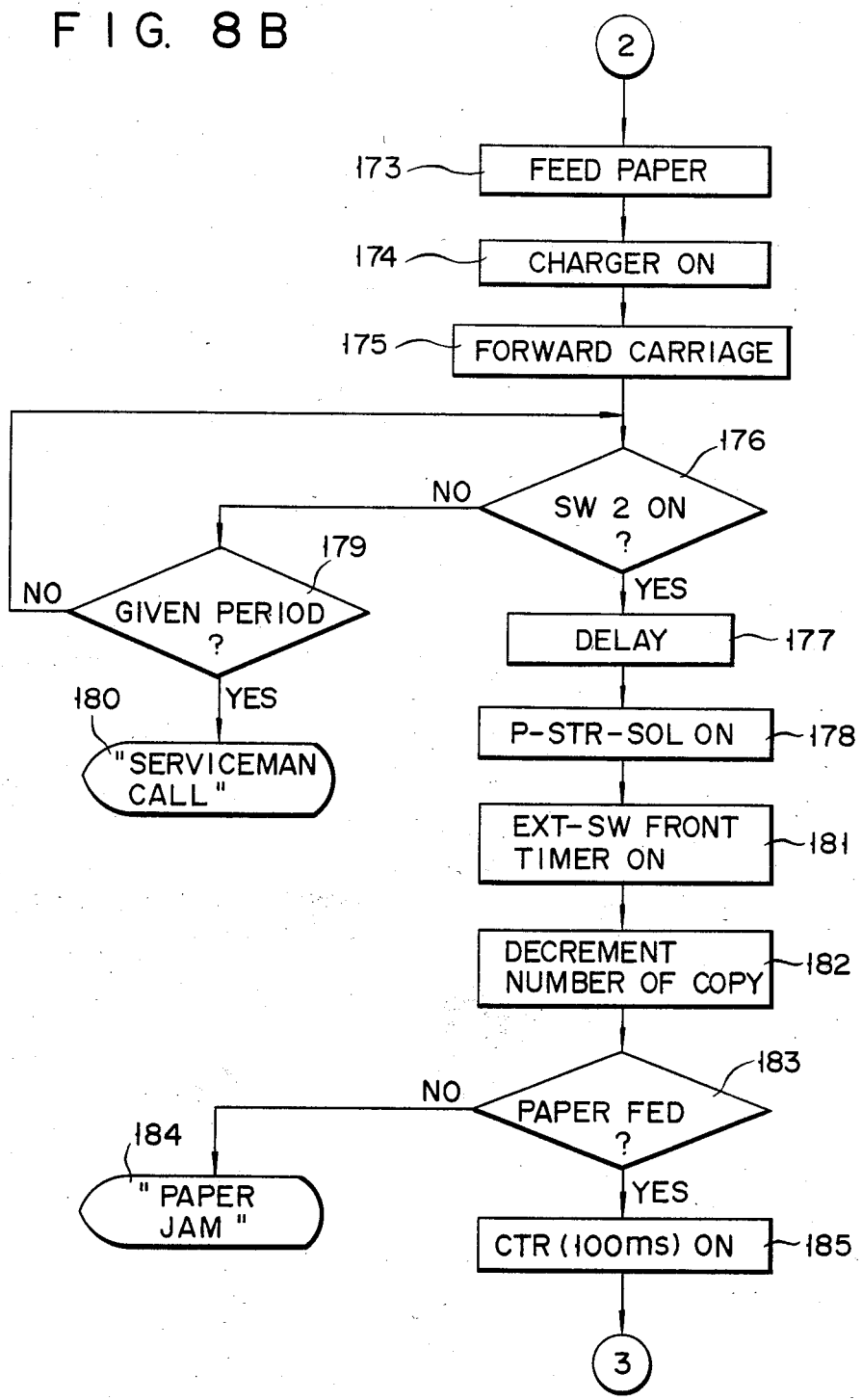
Figure 8C:
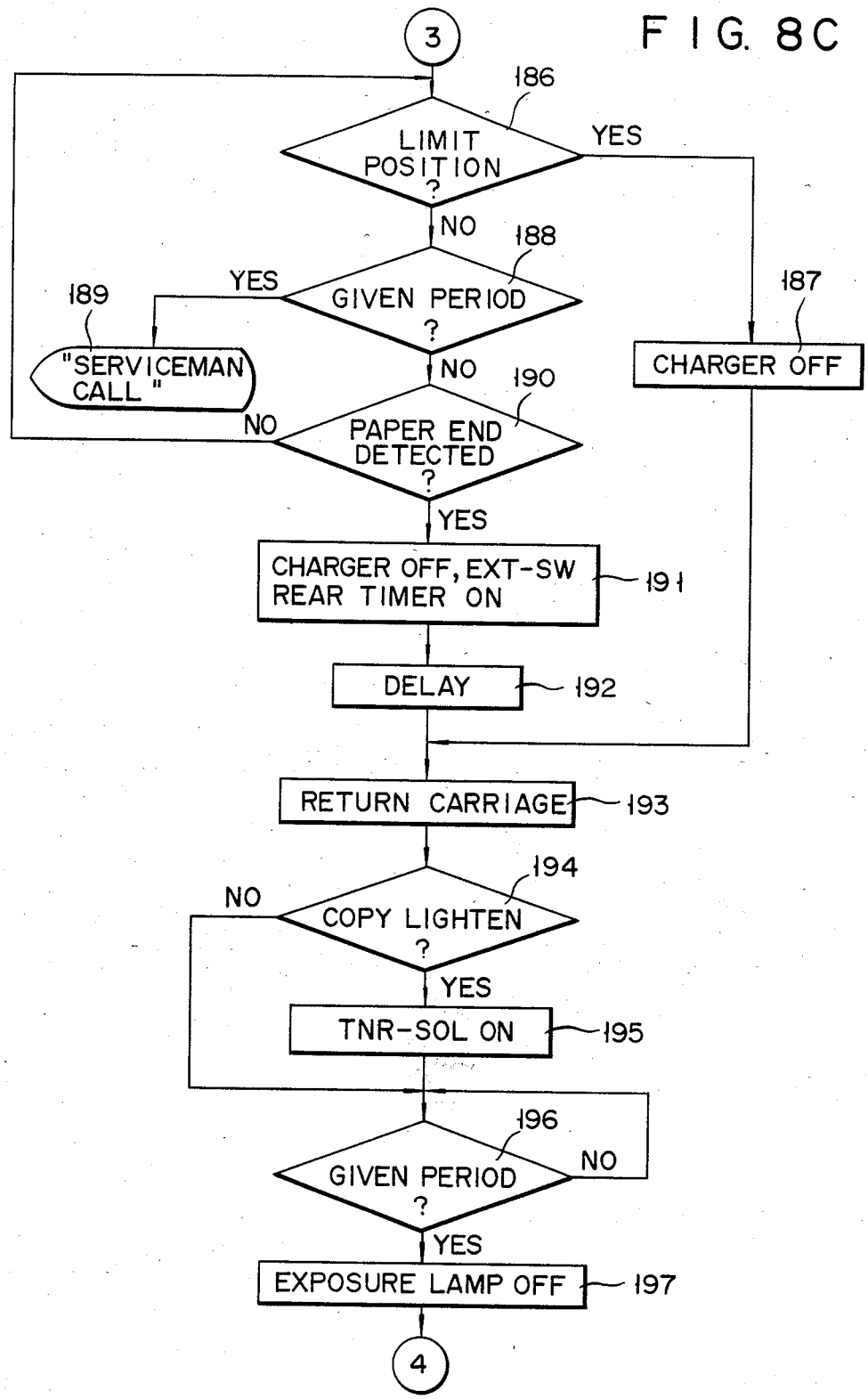
Figure 8E:
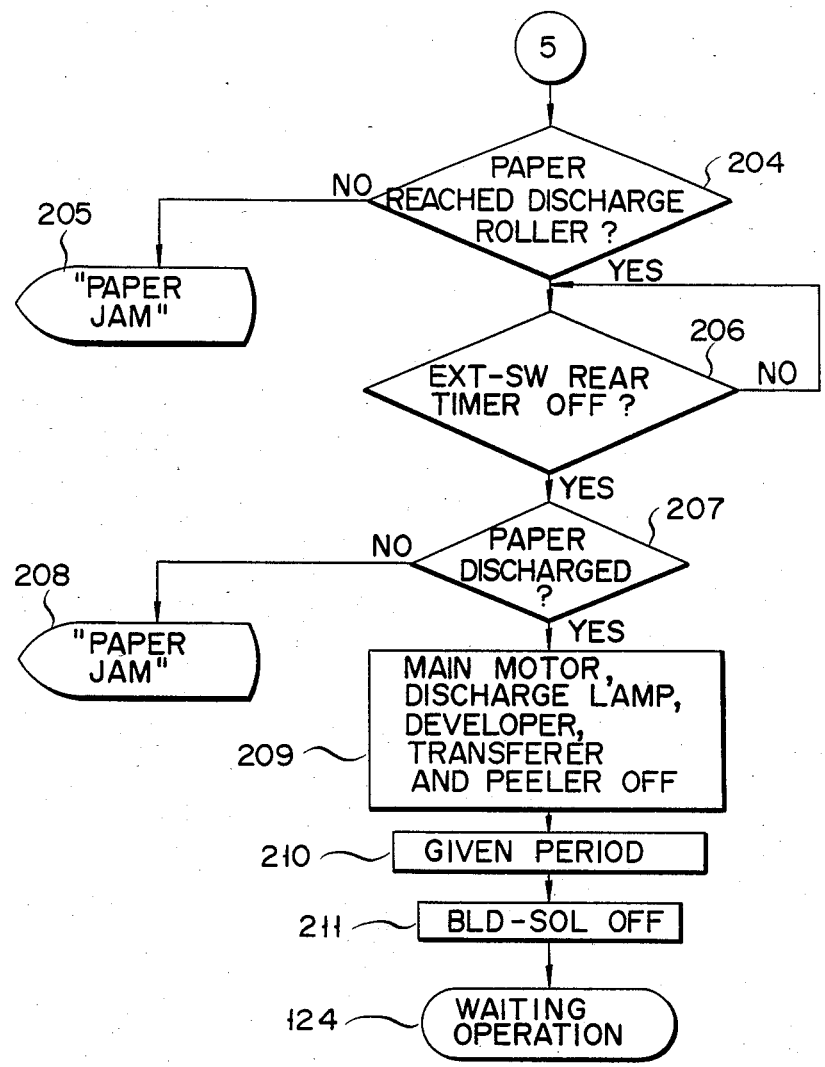

The waiting operation will be described with reference to the flow charts shown in FIG. 7.

In steps 134 to 136, the fetching operation of the copying number, the copying magnification and density and the cassette selection are performed.

In cassette selection (step 136), either the paper feed cassette 22 or manual feeding mechanism is selected. When the cassette selection is performed in this manner, the microcomputer determines whether or not paper sheets are stored in the cassette, in step 137. If NO in step 137, "NO PAPER" is displayed in step 138. If YES in step 137 or when the paper sheets are supplied, "COPYING INSTRUCTIONS" is displayed in step 139. Then, in step 140, the microcomputer determines whether or not paper sheets are inserted in the manual paper feed port 24, thereby determining whether or not the manual paper feed operation starts. If YES in step 140, the BLD-SOL is turned on in step 141. Thereafter, in step 142, the main motor is turned on. At this time, since the P-STR-SOL is kept off, the paper feed roller 25 is rotated and the aligning rollers 26 are stopped. For this reason, the paper sheet is fed to the aligning roller 26 by the paper feed rollers 25. In step 143, when the microcomputer detects that a manual start switch (M-STR-SW) is turned on by this manual paper feed operation, the flow advances to step 144 of the copying operation (to be described later). When the main motor is not rotated longer than the predetermined interval after the M-STR-SW is turned on, "MANUAL FEED ERROR" is displayed and the main motor is turned off, thereby indicating this condition to a user. When the microcomputer detects in step 143 that the M-STR-SW is not turned on, the microcomputer determines whether or not the predetermined period of time has elapsed from when the main motor was turned on in step 145. After the predetermined period of time, the main motor is turned off in step 146. In step 147, "MANUAL FEED ERROR" is displayed so as to indicate that the paper sheets should be removed from the manual paper feed port. In step 148, the microcomputer detects that the paper sheets have been removed from the manual paper feed port, and the flow returns to step 125. On the other hand, if NO in step 140, the microcomputer determines in step 150 whether or not the copying key is turned on. If YES in step 150, the flow advances to copying operation step 144. If NO in step 150, the flow returns to step 125 and the fetching operation of step 134 is repeated.

The copying operation (step 144) will be described with reference to the flow charts shown in FIGS. 8A to 8E. When the copying key 71 is turned on, the BLD-SOL and the P-STR-SOL are turned on and the cleaning blade is urged against the surface of the photosensitive drum 2 in step 162. After a sufficient period of time for operating the cleaning blade passes in step 163, the main motor, discharger lamp 17, the developing bias, the transfer charger 27 and the peeling charger 28 are respectively turned on in step 164. After a predetermined period of time has elapsed in step 165, the microcomputer determines whether or not the carriage is positioned at the initial position in step 167. Since the housing 1 is split into upper and lower casings having the convey path 30 at a boundary, if a paper jam and the like occurs in the convey path 30 and the upper casing 1a is opened, the carriage may be shifted from the initial position. Therefore, if NO in step 167, the carriage is returned to the initial position in step 168. It is determined again in step 169 whether or not the carriage is returned to the initial position. If YES in step 169, the exposure lamp 5 is turned on in step 166. If NO in step 169, the microcomputer determines whether or not the SW2 is turned on in step 155. When the SW2 is not turned on, the carriage is moved backward at a high speed until the SW2 is turned on. When the SW2 is turned on, the high-speed backward movement of the carriage is terminated. The carriage is returned to the initial position at a low speed in step 157 and the exposure lamp 5 is turned on in step 166. That is, in the continuous (successive) copying mode wherein the copying number is at least two, the preliminary lighting of the exposure lamp 5 for the next copying starts when the carriage is returned to the position of the SW2 which is removed by the predetermined distance from the scanning start position. The predetermined distance is determined such that the preliminary lighting is completed when the carriage is returned to the initial position. Therefore, the next copying can be started immediately after the carriage is returned to the initial position without any loss time. The detail of the backward movement of the carriage will be described later. After a predetermined time has elapsed in step 171 after step 166, the P-STR-SOL is turned off and the aligning roller 26 is stopped in step 172. In step 173, the paper feed operation from the selected cassette is performed and a paper sheet is fed to the aligning rollers 26. In the manual paper feed mode, this paper feed operation is omitted. In step 174, the charger 18 is turned on, thereby charging the photosensitive drum 2. In step 175, the carriages move along the direction indicated by the arrow b in FIG. 1 in response to a carriage forward signal, thus starting the document scanning operation. In step 176, the microcomputer determines whether or not the switch SW2 is turned on. If YES in step 176, a predetermined period of time in accordance with the selected copying magnification elapses in step 177. In step 178, the P-STR-SOL is turned on and the aligning rollers 26 are rotated so as to feed the paper sheet to the transfer unit such that the position of the image formed on the photosensitive drum 2 is aligned with that of the paper sheet.

If NO in step 176, the microcomputer determines whether or not a predetermined period of time has elapsed in step 179. If YES in step 179, this indicates a breakdown and "CALL SERVICEMAN" is therefore displayed on the liquid crystal display panel in step 180.

After the P-STR-SOL is turned on, an exhaust switch (EXT-SW) front timer is turned on which thereby starts counting in step 181. In step 182, the displayed number is decremented by one. Thereafter, in step 183, the microcomputer determines whether or not the paper sheet has reached the aligning rollers 26. If NO in step 183, "PAPER JAM" is displayed in step 184. If YES in step 183, a total counter and a key counter are turned on during 100 ms and a total copying number is incremented in step 185.

The document is scanned by movement of the carriages. The reflected light from the document is irradiated on the photosensitive drum 2 through the mirrors 6, 9 and 10, the lens unit 11, and the mirrors 12, 13 and 14 so that an electrostatic latent image corresponding to an image on the document is formed on the photosensitive drum 2. The latent image is coated with toner by the developing unit 19 so as to form the toner image. The toner image is transferred by the transfer charger 27 to the paper sheet. The paper sheet having the toner image thereon is peeled from the photosensitive drum 2 by the peeling charger 28 and is fed to the heat rollers 31 by the convey unit 30 so as to fix the image thereon. The fixed paper sheet is exhausted by the exhaust roller 32 onto the exhaust tray 32 outside the housing 1. The residual toner on the drum 2 is cleaned by the cleaning unit 29. The photosensitive drum 2 is discharged by the discharger lamp 17, thus preparing it for the next copying operation. During the copying operation, when the microcomputer detects that the carriages has reached the limit position (step 186), the charger 18 is turned off in step 187. When carriages do not reach the limit position within a predetermined period of time after the P-STR-SOL is turned on (step 188), this indicates a problem with the carriages and "CALL SERVICE-MAN" is then displayed.

When the paper sheet is fed by the aligning rollers 26, a paper detector detects the trailing end of the paper (step 190). Then, the charger 18 is turned off, thereby stopping the charging of the photosensitive drum 2 in step 191. After a predetermined period of time has elapsed in step 192, the carriages move backward along the direction indicated by the arrow c in FIG. 1 in response to a carriage backward signal and are returned to the initial position. In step 194, the microcomputer checks the toner density in the developing unit 19. If YES in step 194, a toner solenoid (TNR-SOL) for driving the toner supply mechanism of the toner hopper 20 is turned on for a predetermined time period so as to supply toner to the developing unit 19 in step 195. After a predetermined period of time has elapsed after the carriages start to move backward (step 196), the exposure lamp 5 is turned off in step 197.

The microcomputer checks the operating state of the EXT-SW provided adjacent to the exhaust roller 32 to see whether or not a paper jam has occurred in step 198. If a paper jam is detected by this checking operation, "PAPER JAM" is displayed in step 202. If no paper jam is detected, the microcomputer determines whether or not a predetermined number of copies are completed in step 249. If NO in step 249, the next copying starts as shown in step 250. If YES in step 249, the main motor, discharger lamp 17, developing bias, the transfer charger 27, and the peeling charger 28 are turned off in step 209. The main motor is stopped after a predetermined period of time, the BLD-SOL is turned off and the flow returns to step 124 (i.e., the waiting mode).

The movement control operation of the carriages will be described hereinafter. The four modes of the carriages, i.e., the forward, high-speed backward, low-speed backward, and stop modes are encoded in 2-bit signals, respectively, and the microcomputer 41 supplies these signals to the scanning motor control circuit 47. The scanning motor control circuit 47 decodes these signals, thereby driving the scanning motor 51 through the driver 58. When the 2-bit signal disappears between the microcomputer 41 and the scanning motor control circuit 47, the stop mode is set. The forward mode is used only during the copying operation, that is, when the document is scanned. The forward speed is set in such a manner that data calculated in accordance with the selected copying magnification is used as speed data and is supplied from the microcomputer 41 to the scanning motor control circuit 47 in addition to the above 2-bit signal described above.

Two backward operations are provided. During the copying operation, when the scanning operation of the document ends, the high-speed mode is set, thereby returning the carriages to the scanning initial position at high speed. In this case, in order to increase a copying speed, the high-speed backward speed is about twice that of the maximum forward speed. Even if the stop signal is supplied, a free running distance becomes relatively long due to the inertia of the scanning motor and the carriages. Therefore, if the carriages are kept moving near the initial position at high speed and the stop signal is supplied at this time, the carriages move to the limit position by the inertia thereof and are crushed. In order to prevent this, in this embodiment, the switch SW2 is positioned in such a way that it is turned on when the carriages return to a position slightly before the initial position. When the switch SW2 is turned on during the high-speed backward mode, the backward operation mode is changed to the low-speed backward mode. Thereafter, because of the control signal produced from the switch SW2, the carriages move backward in the low-speed backward mode. When the carriages return to the initial position, the switch SW1 is turned on, and the movement mode is changed to the stop mode. Note that after turning on the switch SW2, the carriages moving by the inertia thereof cannot reach the initial position, and therefore they must be moved by the low-speed backward mode. As described above, the carriages can be satisfactorily stopped at the initial position.

The carriages may be moved in the backward other than the copying mode. First, the power is turned on, and second, the copying magnification is changed during the waiting mode. The lens unit 11 of this embodiment consists of the main lens $16_1$ and the auxiliary lenses $16_2$ to $16_4$, as shown in FIG. 1. In the equal copying mode, the lens unit 11 is positioned at a position shown in FIG. 1. In the reduction copying mode, the main lens $16_1$ moves along the direction indicated by the arrow b. In this case, both or either of the auxiliary lenses $16_2$ and $16_3$ in accordance with the selected copying magnification are set at a position overlapping the main lens $16_1$, thereby correcting an optical path length. In the enlargement copying mode, the main lens $16_1$ moves along the direction indicated by the arrow c, and the auxiliary lens $16_4$ is set at a position overlapping the main lens $16_1$. In this case, if the carriages move to the forward limit position along the direction indicated by the arrow b, the mirror 10 will abut against the auxiliary lens $16_4$. In order to prevent this, in this embodiment, a limit switch SW3 for the enlargement mode is provided, which when activated stops the carriages from moving forward. When a plurality of enlargement magnifications are provided, a plurality of limit switches are also provided and forward limit positions are changed in accordance with the selected enlargement magnification.

Figure 9:
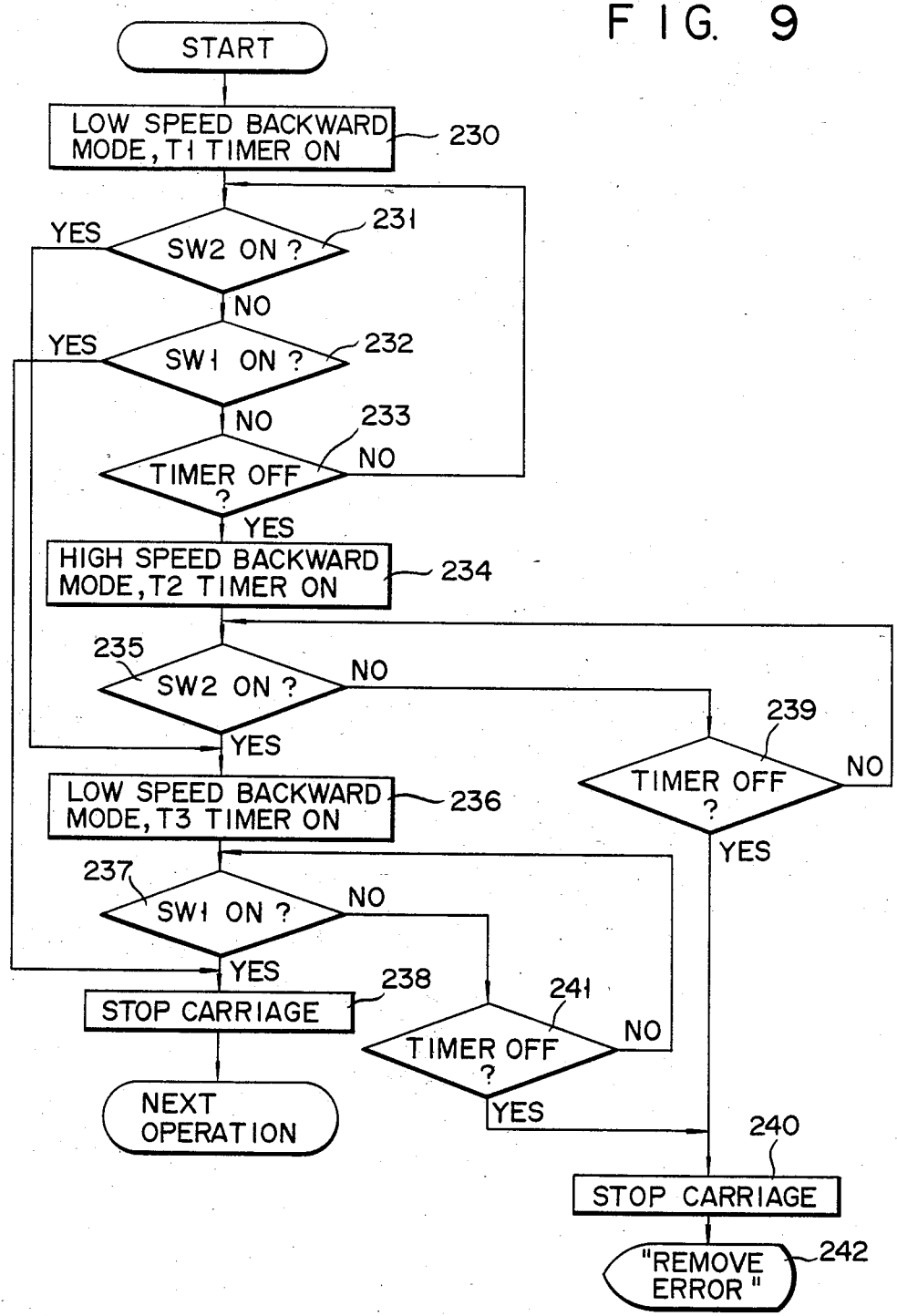
FIG. 9 is a flow chart for explaining the return movement of the carriage.

For example, when the carriages are positioned at the forward limit position for the equal copying mode, the main lens $16_1$ is moved along the direction indicated by the arrow c in order to change the copying magnification to the enlargement mode. In this case, the main lens $16_1$ abuts against the mirror 10 on the way. In order to prevent this, in this embodiment, before the main lens $16_1$ moves, the carriages always return to the scanning initial position. The backward operation of the carriages is as follows and will be described with reference to the flow chart shown in FIG. 9 and the timing charts shown in FIGS. 10A to 10E and 11A to 11E. The carriages move along the direction indicated by the arrow c in the low-speed backward mode (step 230). In this case, the microcomputer 41 sets a built-in timer at a predetermined interval T1 when the carriages start moving at the low-speed backward mode and starts counting. The carriages moved by this low speed movement stop at the initial position and the switch SW1 is turned on (step 233). In this case, the carriages were positioned between the switches SW1 and SW2. On the other hand, after the interval T1 elapses (i.e., the count of the timer ends), when both the switches SW1 and SW2 are off, the carriages were positioned between the switches SW2 and SW4. When the count of the timer ends in step 233, the high-speed backward mode is set in step 234. The following operation is the same as that of the backward operation in the copying operation. In this case, the time charts are as shown in FIGS. 10A to 10E. The interval T1 is expressed by $$T1 = L1 \times V1 + \alpha$$

where L1 is a distance between the switches SW1 and SW2, and α is a margin time. When the switch SW2 is turned on for the interval T1 (step 231), the carriages move to the initial position in the low-speed backward mode (step 236). In this case, the carriages were positioned between the switches SW3 and SW2, and the timing charts become as shown in FIGS. 11A to 11E.

As previously described, the switch SW2 generates two signals. The first signal comprises an image-leading-end aligning signal generated in the forward movement of the carriage when an end portion 36a of the projection 36 contacts the switch SW2, as shown in FIG. 2A. The second signal is generated in the return movement of the carriage when an end portion 36b of the projection 36 contacts the switch SW2, as shown in FIG. 2B. The second signal acts as a backward switching timing signal and, a timing signal representing the start of the copying operation of the next sheet in the continuous copying mode. By such control, preliminary lighting of the exposure lamp and feeding of the sheet from the paper feed cassette can be performed while the carriage is moved backward. As a result, when the carriage returns to the scanning start position, the next document can be immediately scanned. Unlike a conventional copying machine in the continuous copying mode, the preliminary lighting of the exposure lamp need not be halted until the carriage returns to the scanning start position, thereby eliminating idle time and greatly increasing the copying speed (copying sheet number or the number of copying cycles).

Figure 12A:
FIGS. 12A to 12G are timing charts for explaining the carriage control and lighting control of the exposure lamp in the continuous copying mode.
Figure 12B:
Figure 12C:
Figure 12D:
Figure 12E:
Figure 12F:
Figure 12G:

The relationship between feeding control of the first carriage 8 and lighting control of the exposure lamp 5 in the continuous copying mode, as the main feature of this embodiment, will be described with reference to the timing charts in FIGS. 12A to 12G. As shown in FIG. 12B, the paper start solenoid is turned on for a predetermined period of time in response to the start pulse shown in FIG. 12A, and the aligning rollers 26 are rotated. The sheet is forcibly discharged upon rotation of the aligning rollers 26. When the predetermined period of time has elapsed, the paper start solenoid is turned off. As shown in FIG. 12D, the exposure lamp 5 is turned on for the first sheet. As shown in FIG. 12C, the paper feed solenoid is turned on, and the copying sheet is picked up from the selected paper cassette. In this case, as shown in FIG. 12B, since the paper start solenoid is kept off, the aligning rollers 26 are not driven, and the sheet is stopped in front of the aligning rollers 26. When a predetermined period of time has elapsed so as to allow a stable predetermined amount of light to be emitted after the exposure lamp 5 is turned on, the first carriage 8 is moved forward and the document is scanned. When movement of the first carriage 8 is started, as shown in FIG. 12E, the initial position detection switch SW1 is turned off. When the first carriage 8 is moved slightly forward, the switch SW2 is turned on, as shown in FIG. 12F. Upon ON operation of the switch SW2, the paper start solenoid is turned on, as shown in FIG. 12B, and the aligning rollers 26 are rotated. As a result, the copying sheet stopped in front of the aligning rollers 26 is conveyed toward the photosensitive drum 2, thereby starting copying. When the first carriage 8 is moved to the scanning end position and the switch SW3 or SW4 is turned on, the first carriage 8 is stopped. At the same time, as shown in FIG. 12D, the exposure lamp 5 is turned off. The first carriage 8 is moved backward at high speed and returns to the scanning start position. During this operation, when the first carriage 8 has reached the position of the switch SW2, the switch SW2 is turned on, as shown in FIG. 12F. When the switch SW2 is turned on, the paper start solenoid is turned off, as shown in FIG. 12B and the exposure lamp 5 is turned on as shown in FIG. 12D. When a predetermined period of time has elapsed after the paper start solenoid is turned off, the paper feed solenoid is turned on, as shown in FIG. 12C. A sheet is picked up from the selected paper feed cassette and is stopped in front of the aligning rollers 26. As a result, when the first carriage 8 returns to the scanning start position, the exposure lamp is already emitting a sufficient amount of light, and the next sheet is waiting in front of the aligning rollers. Therefore, when the first carriage 8 returns to the scanning start position, the next copy operation is started, thereby effectively performing continuous copying.

In the above embodiment, a proximity sensor is used as a detection switch for detecting a carriage position. However, the carriage position detection switch is not limited to this type of sensor but can be extended to an optical element such as a photocoupler, a mechanical element such as a microswitch, a magnetic switch such as a lead switch, or any other detector.

In the above embodiment, the present invention is applied to the copying machine having a fixed document table. However, the present invention can also be applied to a copying machine having a movable document table. In this case, the exposure lamp and the mirrors are fixed, while the document table is moved.

In the above embodiment, the present invention is applied to a copying machine, but it can be extended to other image forming apparatuses such as a facsimile system, an electronic printer or a printing press.

According to the present invention, there is provided an image forming apparatus wherein idle time can be eliminated in the continuous copying mode, so that the number of copying cycles within a unit of time is increased.

What is claimed:

1. An image forming apparatus comprising:
document table exposure means for receiving a document thereupon;
illumination exposure means for illuminating a document placed on said document table exposure means;
scanning means for reciprocating one of said exposure means relative to the other of said exposure means to optically scan a document on said document table exposure means; and
image forming means for forming an image of the document in response to light reflected by the document, which further comprises:
(a) means for detecting that said one of said exposure means that reciprocates is located at a scanning start position, a scanning end position, and a third position removed by a predetermined distance from the scanning start position and producing an output indicative of the scanning start position, the scanning end position, or the third position; and (b) exposure controlling means for, in a continuous copying mode: (i) turning on said illumination exposure means when said one of said exposure means that reciprocates is located at said third position, and (ii) turning off said illumination exposure means when said one of said exposure means that reciprocates is located at the scanning end position, in response to said indicative output from said detecting means.

2. An apparatus according to claim 1, in which said third position is determined so as to allow a predetermined amunt of light to be emitted by said illumination exposure means between the turning on of said illumination exposure means at said third position and the turning off of said illumination exposure means at said scanning end.

3. An apparatus according to claim 1, wherein:
said apparatus further comprises a paper feed cassette, and means for feeding a sheet from said paper feed cassette in response to the output from said detecting means; and said image forming means includes: (a) a photosensitive body on which the image of the document is formed in respose to the light being reflected by the document exposed by said illumination exposure means, and (b) means for transferring the image on said photosensitive body to a sheet fed from said paper feed cassette.

4. An apparatus according to claim 1, in which said scanning means comprises a reversible motor and carriage means for reciprocating said illumination exposure means between one end and the other end of the document upon rotation of said reversible motor.

5. An apparatus according to claim 4, in which said detecting means includes sensor means for detecting when said carriage means approaches said sensor means.

6. An apparatus according to claim 1, in which said exposure controlling means further includes means for, in a single copying mode, turning on said illumination exposure means in response to an image designation input and turning off said illumination exposure means at the end of a reciprocating by said scanning means.

* * * * *